UNITED STATES PATENT OFFICE.

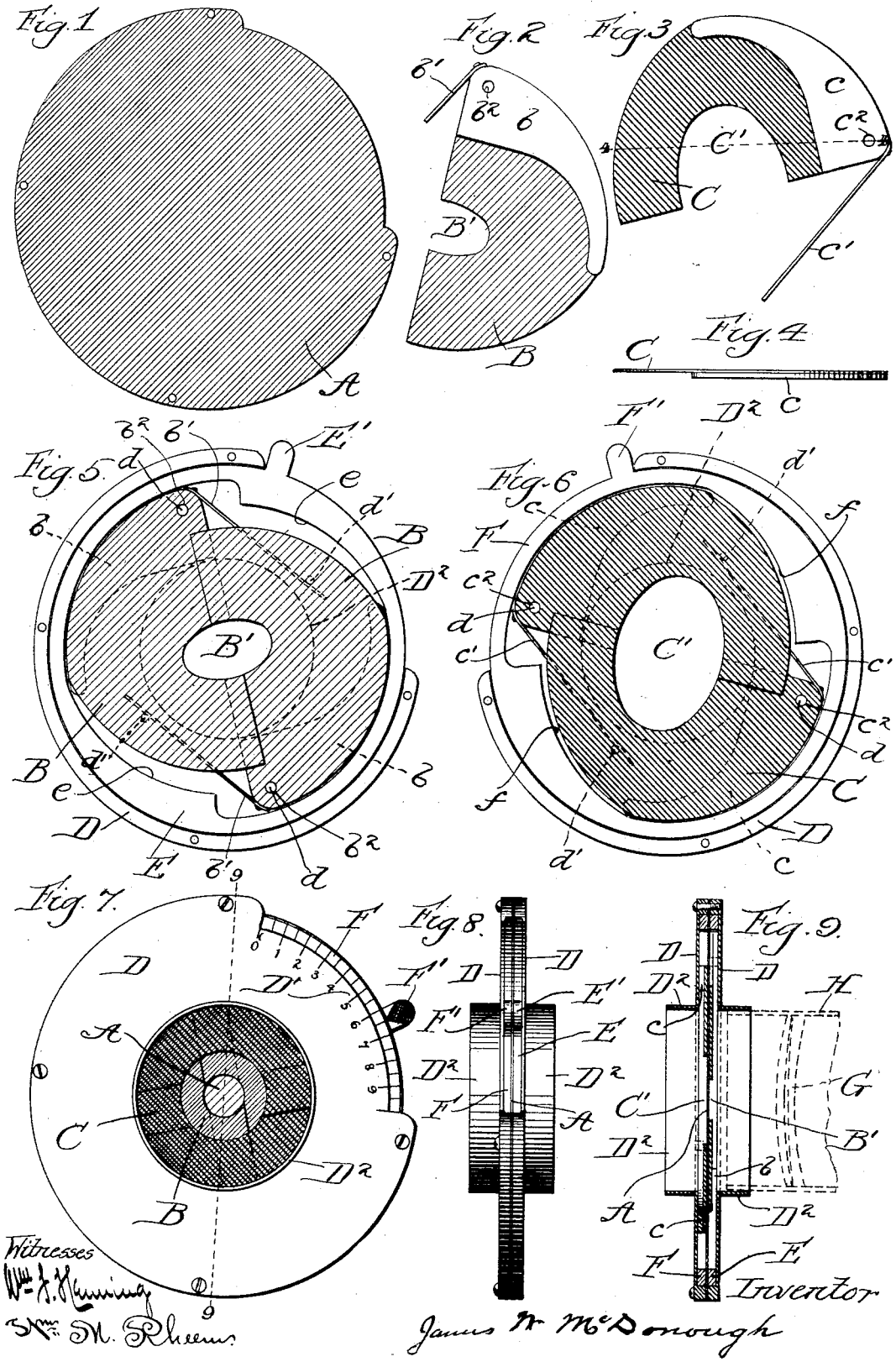

JAMES W. McDONOUGH, OF CHICAGO, ILLINOIS.

PHOTOGRAPHIC COLOR-SCREEN.

SPECIFICATION forming part of Letters Patent No. 562,642, dated June 23, 1896.

Application filed March 7, 1896. Serial No. 582,195. (No model.)

*To all whom it may concern:*

Be it known that I, JAMES W. MCDONOUGH, a citizen of the United States, residing at Chicago, Illinois, have invented certain new and useful improvements in photographic screens and the method of regulating the quantity of the different-colored rays which pass from the object to the sensitive plate, of which the following is a specification.

The object of my invention is to make a new and improved adjustable regulating-screen for use with a camera in taking photographs, by which the quantity of the different-colored rays of light which pass from the object to be photographed to the sensitive plate may be regulated in relation to each other, determinate upon the nature of the light existing at the time the photograph is taken. While it is intended for use in taking all kinds of photographs, it is more particularly intended by me for use in taking photographs in colors.

My invention will be more fully understood from a detailed description, in connection with the drawings, as hereinafter explained.

My improved screen may be placed either before or behind the lens of the camera, or, if preferred, it may be placed in a slot between the two glasses constituting the lens. It places in the hands of a photographer means by which he can regulate the color values of different light passing from the object to be photographed to the negative-plate.

Sensitive plates used in taking photographs differ in their actinic properties in accordance with different sensitizing processes. With most sensitive plates the more refrangible rays, such as violets and blues, act very rapidly, and the less refrangible rays, such as reds and yellows, act very slowly. In fact, the ratios vary to a large extent. It is also well understood as a fact that in different localities there are more or less alterations of the actinic values in light. Pure sunlight, for example, is different from subdued light or artificial light. On a bright, sunny day the red and yellow colors in the light are in larger proportions than on cloudy days, while the blue and violet colors are in smaller proportions. If we look, for example, at a landscape on a dull day through a piece of orange or yellow colored glass, which suppresses the blue rays, the landscape will appear to be illuminated with sunshine, thus showing that there is an excess of red and yellow light on a bright day. Different parts of the sky are differently illuminated, the position of the sun altering the values of the colors. Accepting vermilion red, emerald green, and ultramarine blue as representing the three fundamental colors of light, it is important to provide means for altering the amount or value of each separate color that falls upon the negative-plate after its passage from the object to be photographed.

In the drawings, Figure 1 represents a side elevation of a plate formed of a very thin piece of clear mica, celluloid, or other suitable transparent material, the surface of which is covered with a thin and very transparent substance, as, for instance, a lemon-yellow. Fig. 2 represents a side elevation of a piece of mica, or other suitable material, covered with a thin coating of, say, lemon-yellow substance, and attached to a piece of metal as a part of a moving mechanism. Fig. 3 represents a side elevation of a piece of mica, or other suitable material, covered, say, with a thin coating of orange substance, and attached to a piece of metal as a part of a moving mechanism. Fig. 4 shows a section taken in line 4 4 of Fig. 3. Fig. 5 shows a side elevation of a receptacle having a movable double-eccentric ring and a pair of movable pieces like those shown in Fig. 2 arranged on one of its sides or faces. Fig. 6 shows a similar receptacle having a movable eccentric-ring and a pair of movable pieces like those shown in Fig. 3 arranged on its opposite sides or face. Fig. 7 shows a side elevation of a completed screen containing my improvements. Fig. 8 represents an edge elevation of the screen shown in Fig. 7; and Fig. 9 shows a vertical section of the screen, taken in line 9 9 of Fig. 7, arranged in place on the outer end of the tube of a lens.

In making my improved screen I make a plate A, of a sheet of thin mica, celluloid, or other suitable transparent material, covered with a light lemon-yellow-colored substance, which I represent by the parallel lines and which is intended to absorb the excess of action of the blue rays. If I employ a deeper shade of yellow, it would absorb all the blue rays, which is not desired. If preferred, however, the color on the plate A may be entirely omitted, in which case the plate itself may be dispensed with. When the color is omitted or the plate itself dispensed with, however, a deeper shade of color should be used on the parts hereinafter described. This plate admits the passage of red and green rays, and a small proportion of the blue rays. I then make a pair of movable plates B, like those represented in Fig. 2, with preferably an opening B' in the form of a half-ellipse in each. This plate is strengthened and supported by a metal holding-piece $b$, and is provided with a spring $b'$. It is also provided with a hole $b^2$ to enable the piece to be pivotally mounted, as hereinafter explained. The piece B is intended to be covered or coated with a light lemon-colored substance, represented by the parallel lines shown on it. I then make a pair of movable pieces C, preferably provided with a half-elliptical opening C' in each, made larger than the opening B'. Each of these pieces is also supported and strengthened by a metal holding-piece $c$, provided with a spring $c'$, and with a hole $c^2$, to enable the piece to be movably mounted, as hereinafter explained. I then make a receptacle D, formed of a ring, not entirely complete, with side pieces extending inwardly and provided with an annular opening at their centers. These side pieces may be made integral with the ring, so as to form part of it, or be fastened to the ring by screws, as shown in Figs. 7, 8, and 9 of the drawings.

I arrange on the side pieces a scale D', represented by various numerals, as shown in Fig. 7, and provide the pieces with outwardly-extending flanges $D^2$, (shown in Figs. 8 and 9,) to enable the receptacle to be slipped over the outer end of a tube H of a lens G, as shown in Fig. 9, and receive a cap (not shown) to exclude the light. Within this receptacle I arrange two movable rings E and F, provided with handles E' and F', to enable them to be turned or slipped around in the receptacle. These handles are provided with points or verniers, so that they can be adjusted at any point desired on the indicating-scale.

Within the receptacle I arrange at one side double eccentrics $e$, and at the other double eccentrics $f$, constituting, respectively, parts of the rings E and F, so as to turn with them. I then pivot to the sides of the receptacle D, by means of pins $d$, on one side of the plate A, a pair of movable plates B, and on the other a pair of movable plates C. The springs $b'$ on the plates B and $c'$ on the plates C rest against pins $d'$, extending inward from the sides of the plates D, so that as the rings E and F are moved in one direction or the other, the plates B and C will be moved by the tension of the springs in or out, thus increasing or diminishing the opening B' on one side of the plate A and the opening C' on the other side of the plate A, as may be desired. In Figs. 5, 6, and 7 the openings formed by these plates are shown. In Fig. 5 an elliptical opening B' appears, formed by the half-elliptical openings B' of the plates B. In Fig. 6 an elliptical opening C' appears formed by the half-elliptical openings C' of the plate C. In Fig. 7 circular openings appear, caused by the movement of the plates B and C sufficiently toward each other to change the elliptical openings into the circular openings.

In the use of the screen, if it is desired that a small quantity of blue rays shall be admitted from the object to be photographed to the negative-plate, the pieces B should be moved toward each other, so as to diminish the space in the plate A, through which the rays of light pass; while if a larger quantity of blue rays be desired, the pieces B may be moved from each other. If a small quantity of green rays be desired, the pieces C may be moved toward each other; while if a larger quantity be desired, they may be moved from each other, thus presenting less obstruction to the passage of the green rays. The red rays pass through the entire circular opening in the screen, as they pass through all of the plates used in the formation of the screen. If, now, the day on which it is desired to use the screen be bright, the handle E' should be moved opposite that numeral in the scale that will admit the desired quantity of blue rays; while if the day be dull, it should be moved opposite a numeral which will permit the less quantity of blue rays to pass through the screen. In the same manner, if it be desired to admit a larger or smaller quantity of green rays, the handles F' should be moved backward or forward until they register with the numeral on the scale at which the desired quantity of green rays will be permitted to pass through the screen. In practice these handles may be readily adjusted to obtain equal action of the three colors passing from the object to the sensitive plate. The openings assume a size to admit the desired quantity of the different kinds of rays, according to the position of the handles. The orange-regulating screen covers the margin of the lens, the opening of the screen allowing the passage of the blue rays to the center and the green the intermediate space. This arrangement gives a more coincident focus for the separate colors, as the different circles of colored substances act in the nature of diaphragms or "stops," through means of which the openings for the passage of blue and green rays are smaller than that for the passage of the red rays, in consequence of which the focus of the blue and green rays is lengthened to coincide with that of the red; and the position of this screen near the lens causes a diffusion of the different colors and makes the different circles and lines unobservable when the picture is formed upon the sensitive plate. If preferred, different thicknesses of mica may be employed to subserve the focusing of the different-colored rays.

When this screen is placed near the sensitive plate, the different circles of light will be impressed upon the plate, together with all markings, thus defeating the object. Other shades and tints, and even colors, may be used in this combination; but those described have seemed to me to give the best results.

As already intimated, these regulating-screens are particularly valuable for use in connection with my multicolored screens formed in fine alternating lines or dots in primary colors, which are placed in close contact with the sensitive plate. A white object placed in the view may be used to form a spot in the picture where comparison may be made to determine exact equal-colored impressions upon the negative.

What I regard as new, and desire to secure by Letters Patent, is—

1. A compound regulating-screen composed of two or more transparent plates uniformly tinted with different tints or colors, and adapted to be placed near the lens of a photographic camera, whereby the rays of light from an object to be photographed pass through such screen before reaching the sensitive plate.

2. A compound regulating-screen composed of two or more transparent plates uniformly tinted with different tints or colors, arranged nearly in the same plane and adapted to be placed near the lens of a camera, whereby the rays of light from an object to be photographed pass through such screen before reaching the sensitive plate.

3. A compound regulating-screen composed of two or more transparent plates uniformly covered with different tints or colors, arranged in nearly the same plane so as to be movable in relation to each other, and adapted to be placed near the lens of a camera, whereby the rays of light from an object to be photographed pass through such screen before reaching the sensitive plate.

4. A compound regulating-screen composed of two or more transparent plates of different tints or colors, arranged to be movable in relation to each other, and adapted to be placed near the lens of a camera, combined with means for adjusting the plates in relation to each other, whereby the area of each color may be easily adjusted to different conditions of light.

5. A compound regulating-screen composed of two or more transparent plates of different tints or colors, arranged to be movable in relation to each other, and adapted to be placed near the lens of a camera, combined with indicating-scales and means for adjusting the area of the different colors in relation to each other, whereby they may be easily and certainly adjusted to different conditions of light.

6. A compound regulating-screen composed of two or more transparent plates of different tints or colors, adapted to be placed near the lens of a photographic camera, and having the part of the screen for regulating the quantity of the red and green rays surrounding the margin of the lens-opening, and the part permitting the passage of the blue rays over the center of the lens-opening, and the part permitting the passage of the green rays and regulating the passage of the blue rays intermediate the margin and the center.

JAMES W. McDONOUGH.

Witnesses:
 THOMAS A. BANNING,
 THOMAS B. McGREGOR.